Patented Jan. 4, 1927.

1,613,451

UNITED STATES PATENT OFFICE.

WALTER HAMIS GLOVER, OF BEDFORD, AND EMILE VAN WEYENBERGH, OF COVENTRY, ENGLAND, ASSIGNORS TO COURTAULDS LIMITED, OF LONDON, ENGLAND.

PROCESS OF MAKING ACYLATED CELLULOSE ETHERS.

No Drawing. Application filed July 22, 1925, Serial No. 45,407, and in Great Britain September 15, 1924.

It is known that cellulose alkyl ethers, which are soluble in alkali solutions, can be esterified by treatment with a mixture of acetic acid and acetic anhydride.

The inventors have found that cellulose ethers which are insoluble in alkali, when treated with a lower fatty acid, with, or without, the addition of a suitable catalyst, readily undergo esterification; a cellulose ethyl-ether approximating in composition to a cellulose diethyl-ether, being, for instance, converted, by the action of formic acid, acetic acid, or propionic acid, into a cellulose diethyl ether formate, acetate, or propionate respectively.

The ether-esters obtained according to this invention possess valuable properties not always possessed by the cellulose ethers from which they are derived. For instance, a cellulose diethyl-ether, soluble in or gelatinized by cold water and incompletely soluble in organic solvents, upon being treated with a lower fatty acid, is converted into a product which is quite resistant to water, even at two degrees centigrade, and is readily soluble in organic solvents yielding perfectly clear solutions. The treatment with the fatty acid may be carried out either alone, or in the presence of a catalyst such, for example, as sulphuric acid and either at ordinary or at elevated temperatures, it being preferred, however, to carry out the treatment in the absence of a catalyst at a raised temperature. Without such catalyst the reaction proceeds very slowly at ordinary temperature. Esterification by means of the more powerful agents such as acetic anhydride and acetyl chloride does not form a part of this invention.

As an example of treatment in accordance with this invention, a cellulose ethyl-ether, containing 26.3 per cent of ethyl ($C_2H_5$) soluble in cold water and incompletely soluble in acetic acid, pyridine, benzene, alcohol, methylacetate or dichlorethylene, is treated with glacial acetic acid at from 70 to 90 degrees centigrade. The ether goes completely into solution and the resulting product is precipitated (by any suitable means) either immediately, or after further heating, and is washed and dried. The substance thus obtained is insoluble in cold water, but is readily soluble in acetic acid, pyridine, benzene, alcohol, methyl-acetate or dichlor-ethylene, the solution being perfectly clear. If sulphuric acid (say two to four per cent by weight thereof) be added to the acetic acid used as in the foregoing example, a similar result will be obtained without the temperature of the mixture being raised above twenty degrees centigrade.

The ether-esters, produced in accordance with this invention, are particularly suitable for the production of threads or filaments, either by dry or wet spinning processes, and also for the production of clear pliable films.

What we claim is:—

1. A process for the esterification of cellulose ethers which are insoluble in alkali, by treatment with a lower fatty acid.

2. A process for the esterification of cellulose ethers which are insoluble in alkali, by treatment with a lower fatty acid in the presence of a catalyst.

3. A process for the esterification of cellulose ethers which are insoluble in alkali, by heating the cellulose ethers with a lower fatty acid.

4. A process for the esterification of cellulose ethers which are insoluble in alkali, by heating the cellulose ethers with a lower fatty acid in the presence of a catalyst.

In testimony whereof we have signed our names to this specification.

WALTER HAMIS GLOVER,
EMILE VAN WEYENBERGH.